Aug. 23, 1949.
F. J. PAUL
2,479,961
MACHINE FOR REMOVING STEMS AND CAPS FROM BERRIES, FRUIT AND THE LIKE
Filed Oct. 18, 1946
3 Sheets-Sheet 1
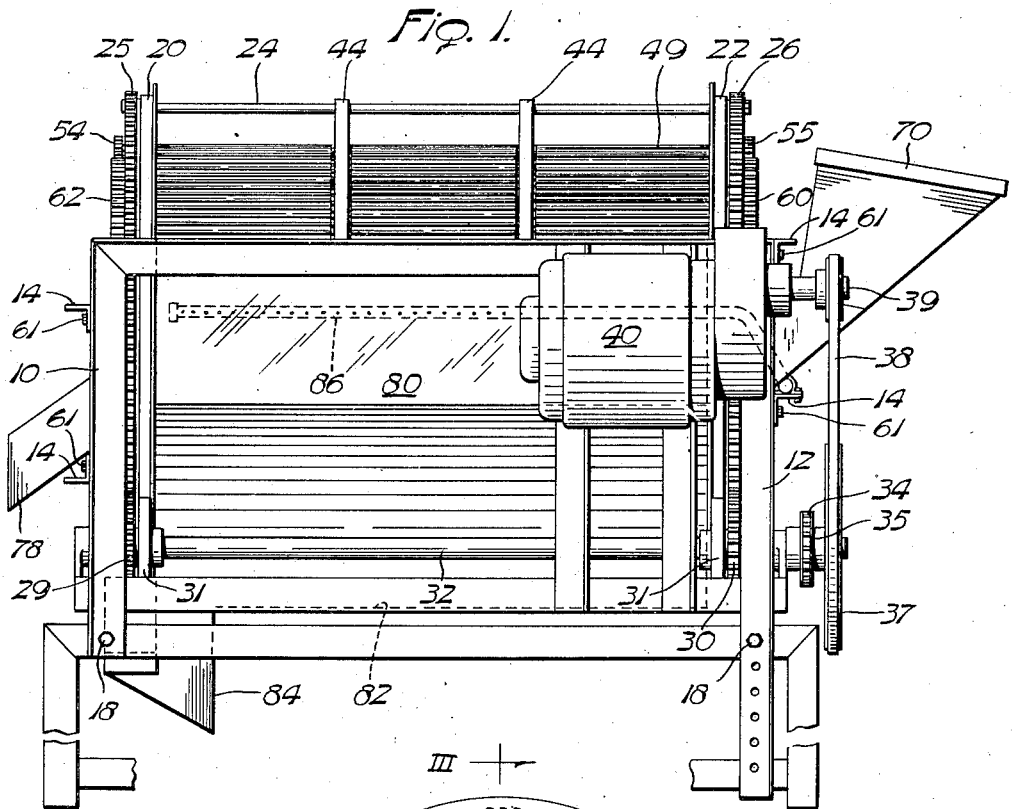
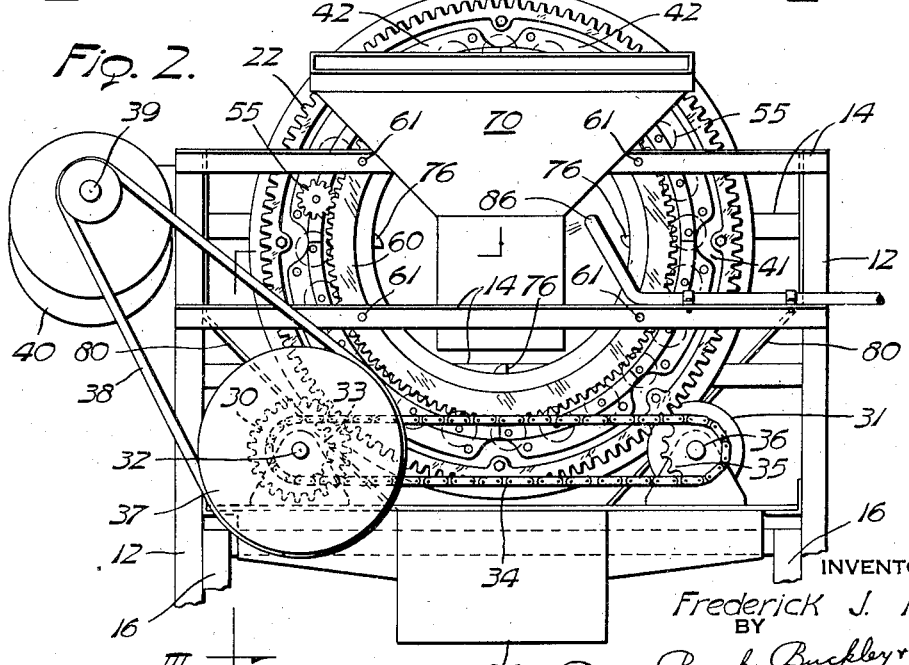
INVENTOR
Frederick J. Paul
BY
Beau, Brooks, Buckley & Beau.
ATTORNEYS

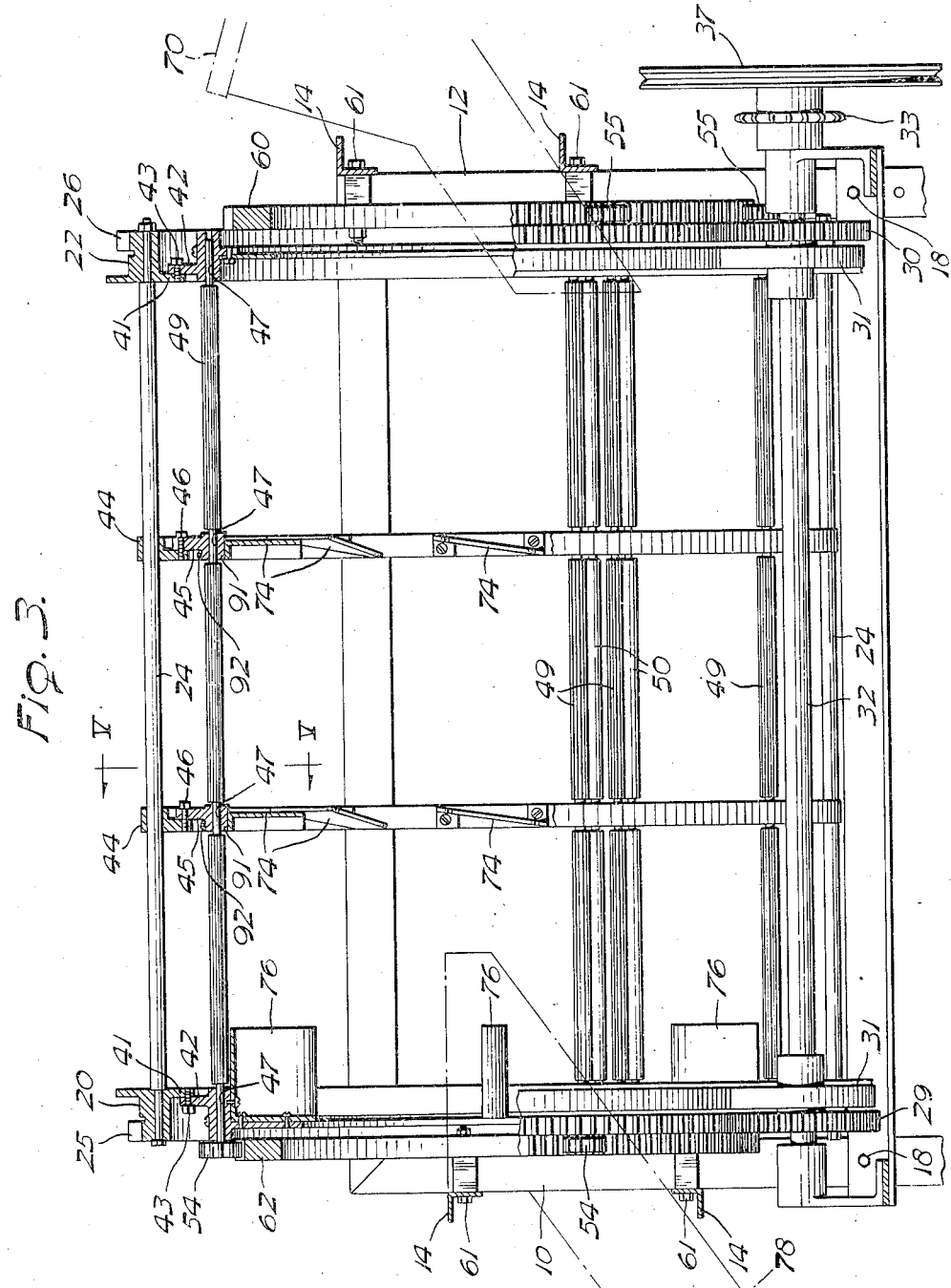

Aug. 23, 1949.  F. J. PAUL  2,479,961
MACHINE FOR REMOVING STEMS AND CAPS
FROM BERRIES, FRUIT AND THE LIKE
Filed Oct. 18, 1946  3 Sheets-Sheet 3

INVENTOR
Frederick J. Paul
BY
Bean, Brooks, Buckley & Bean
ATTORNEYS

Patented Aug. 23, 1949

2,479,961

UNITED STATES PATENT OFFICE 2,479,961

MACHINE FOR REMOVING STEMS AND CAPS FROM BERRIES, FRUIT, AND THE LIKE

Frederick J. Paul, Fredonia, N. Y., assignor to Huntley Manufacturing Co., Brocton, N. Y.

Application October 18, 1946, Serial No. 704,120

1 Claim. (Cl. 146—55)

This invention relates to an improved apparatus for destemming fruit, and more particularly to an improved method and machine for large scale continuous handling of fruits such as strawberries, cherries, plums and the like, while removing the stems and other field debris therefrom.

One of the objects of the invention is to provide an improved method and machine for the purpose aforesaid, whereby the fruit being treated is caused to tumble and come into contact with the destemming elements of the machine in improved manner. Another object of the invention is to provide an improved machine for the purpose aforesaid whereby the fruit being treated is protected against undue bruising damage. Another object of the invention is to provide a machine embodying the features aforesaid, and so constructed as to procure improved percentage of destemming results. Another object of the invention is to provide a machine of structurally simplified and rugged design, while embodying the aforesaid features. Other objects and advantages of the invention will appear from the specification hereinafter.

In the drawings:

Fig. 1 is a side elevation of a machine of the invention;

Fig. 2 is an end view thereof;

Fig. 3 is a longitudinal sectional view, on an enlarged scale, as along line III—III of Fig. 2;

Figure 4:
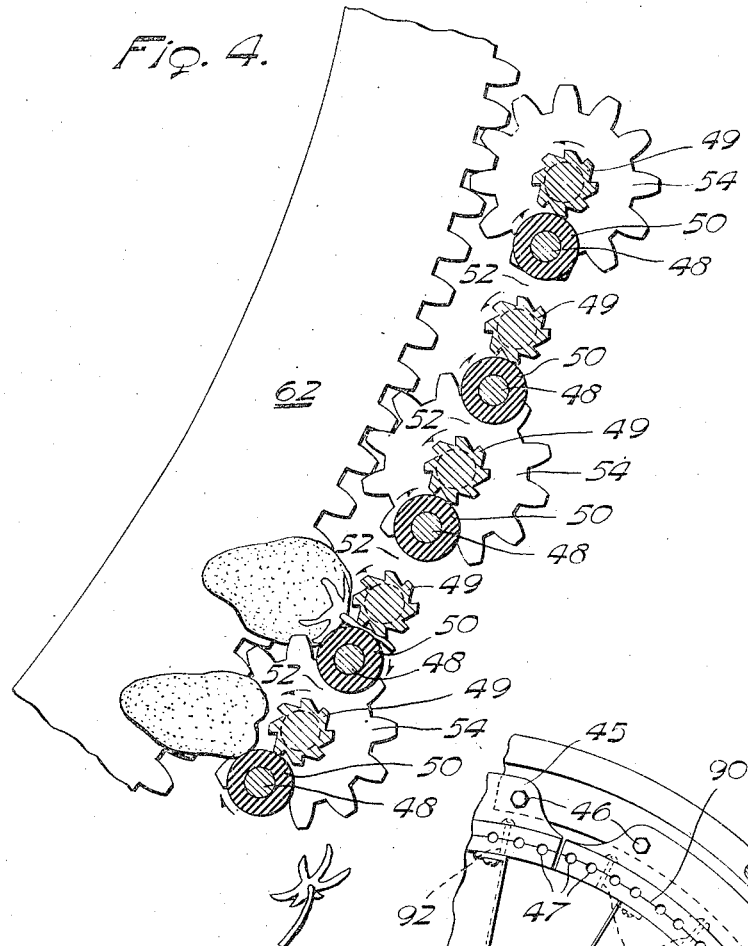
Fig. 4 is a fragmentary typical sectional view, on an enlarged scale, through a portion of the destemming devices of the machine.

The invention is illustrated in the drawing in conjunction with a machine of a style adapted for use in a fruit processing factory or the like, whereby either basket loads or a continuous stream of fruit may be fed to the inlet hopper portion of the machine for processing the fruit in the form of a continuous stream through the machine. More specifically, the drawing herein illustrates a machine designed especially for decapping or destemming strawberries; but it will be understood of course that the principles thereof may be employed in conjunction with variations of the designed illustrated herein for use in processing other fruits or the like.

Fig. 1 illustrates the machine to include a base frame consisting of upright posts 10—12 at the discharge and feed end portions of the machine, respectively. Cross bars 14 interconnect the posts both longitudinally and transversely of the machine so as to provide a box frame upon which the operative portions of the machine are based. As illustrated in Figs. 1–2, the machine frame may be mounted above a refuse bin, portions of which are indicated at 16; the posts 12 of the upper frame being vertically adjustable relative to the refuse bin 16, as by means of the bolt and hole connections indicated at 18, so that the destemming machine frame may be adjusted to either horizontal or longitudinally inclined attitudes, for purposes to be explained hereinafter.

The fruit destemming mechanism resembles exteriorly a cylinder mounted upon the machine frame to be rotatable about the cylinder axis; and as illustrated herein the cylinder-like mechanism comprises an end ring 20 adjacent the discharge end of the machine and a similar end ring 22 adjacent the feed end of the machine. The rings 20—22 are interconnected by longitudinally extending tie-rods 24 which are spaced at intervals about the rings. An external gear 25 is formed integrally with the ring 20, and a similar external gear 26 is formed on the ring 22. The gears 25—26 mesh with drive pinions 29—30, respectively, and a pair of rollers 31 at each end of the cylinder unit is arranged to bear against the track portions 20—22 thereof whereby the cylinder unit is supported in trunnion fashion and is rotatable thereon in response to driving of the gears 29—30. The gears 29—30 are interconnected by a drive shaft 32, and the drive shaft 32 carries a sprocket 33 which is interconnected by means of a cross chain 34 to a sprocket 35 which is keyed to a shaft 36. The rolls 31 are keyed to the shafts 32—36 at opposite sides of the unit, and the shaft 32 carries a drive pulley 37 which is arranged to be driven by a belt or chain 38 from the drive shaft 39 of a geared motor unit 40 mounted upon the machine frame structure. Thus, it will be understood that operation of the motor 40 will drive the shafts 32—36 so as to cause the cylinder unit to rotate upon the trunnion rolls 31 about the longitudinal axis of the cylinder unit.

The end rings 20—22 are each formed with an annular flange 41 to which are bolted a series of segmental plates 42, by means of bolts 43; and intermediate rings 44 are mounted upon the tie rods 24 so as to rotate with the cylinder unit in parallelism with the end rings 20—22. Segmental plates 45 are bolted to the rings 44 as at 46; and the segmental plates 42—45 therefore move with the cylinder assembly and form the inner peripheries thereof. The plates 42—45 are bored as indicated at 47 (Fig. 5) to provide bearings for pluralities of paired shafts 48—49. As shown in detail in Fig. 4, each shaft 48 carries a soft rubber covering 50 of roll form, and the shafts 49 are shaped into the form of corrugated rolls at positions intermediately of the bearing plates 42—45 (Figs. 4 and 6).

The rolls 49—50 are paired as shown in detail in Fig. 4, so that the rolls of each pair are in mutually bearing relation while adjacent pairs of rolls are relatively spaced so as to provide therebetween gaps 52. The corrugated rolls 49 are arranged to be power driven while the rubber covered rolls 50 are driven because of their frictional contacts with the driven rollers 49. For this purpose spur gears 54 are keyed to alternate of the rolls 49 at one end of the cylinder unit, while at the other end of the cylinder unit the others of the rolls 49 are keyed to spur gears 55. The spur gears 54 are arranged in mesh with an external ring gear 60 which is disposed concentrically of the axis of rotation of the cylinder unit and fixed positionally and against rotation by means of being bolted to the machine frame as at 61. A similar ring gear 62 is disposed at the other end of the machine concentrically of the axis of rotation of the cylinder unit and in mesh with the pinions 54, and is also fixed positionally and against rotation by means of a suitable bolting to the machine frame. Thus, it will be appreciated that in response to rotation of the cylinder unit the pinions 54—55 will be forced by the stationary gears 60—62 to rotate the rolls 49 in their bearings relative to the segmental plates 42—45.

As illustrated in detail in Fig. 4, the rolls 49 are corrugated and are formed of suitable metal or other relatively hard material, while the rolls 50 are preferably covered with soft rubber sleeves which are so dimensioned as to frictionally engage the corrugated surface portion of the next adjacent roll 49. Thus, since the rolls 50 are otherwise unrestrained, rotation of the rolls 49 will in each case procure rotation of the next adjacent rubber covered roll which is in effect geared thereto. The roll driving mechanisms are arranged so that the roll units 49—50 rotate in such directions as to automatically gather the stem or cap portions of fruit reclining against the interior surfaces of the cylinder unit and to pull such cap or stem portions into the contact zone between the rolls of each pair thereof, so that the corrugations of the rolls 49 and the rubber covers of the rolls 50 will cooperate to drag such stem and cap portions in between the contacting rolls so as to be nipped and pinched away from the fruit. The rolls 49—50 are so dimensioned as to provide therebetween suitable angles of nip so as to effectively engage the stem and cap portions of the fruit while avoiding nipping or bruising of the desirable portions of the fruit. The roll units are spaced so as to provide the gaps 52 therebetween for the purpose of relieving wear against the rubber rolls on the sides where the rolls are not in "nipping" contact and to permit twigs or other debris to filter out of the fruit load and to be screened therefrom without going through the pressure rolls so that a produce discharge of maximum cleanliness will be provided.

A feed hopper such as is illustrated at 70 will be provided at the vertically adjustable end of the machine to receive the produce feed either in the form of a continuous stream or in batches as when dumped from baskets; so that the produce feed will be introduced to the interior of the cylinder unit in the form of a substantially uniform stream. Means for progressively displacing the produce feed from the feed end portion of the cylinder unit toward the discharge end portion thereof may be provided either by elevating the feed end portion of the cylinder unit (as by raising the posts 12 so that the unit assumes a longitudinally inclined attitude) or by providing within the cylinder unit inclined baffle means such as a spirally wound baffle plate. Or, the combination of both of the above means may be employed, and in any event it will be understood that the produce load will be thereby caused to travel slowly from the feed end portion of the cylinder unit toward the discharge end portion thereof while the strawberries or other fruit being treated are individually tumbled and caused to rotate continuously so as to present their stem or cap portions inwardly of the "nip" spaces between the rolls of each pair. As explained hereinabove, the paired rolls then cooperate to pluck the stems or cap portions from the fruit and to discharge the debris from the fruit load exteriorly of the cylinder unit so as to fall into the debris bin 16 therebelow.

To assist transportation of the berries along the inner surface of the cylinder unit wall, and across the gaps between the berry contacting portions of the rolls 49—50 where the latter are journalled in the ring plates 45—45, I prefer to mount a series of inclined flight plates 74 around the inner peripheries of the rings 45—45 (Fig. 3). The plates 74 are so inclined that as the cylindrical unit rotates the plates 74 assist the berries or fruit in moving longitudinally of the machine and in passing over the gaps between the roll sections caused by their being journalled in the rings 45—45. Also, at the discharge end of the cylindrical unit I prefer to mount a plurality of elevator plates 76 so that as the produce feeds toward the discharge end of the unit it is picked up by the plates 76 and carried thereby to elevated position above a discharge chute 78, whereby the prepared fruit is lifted over the gear and ring structures at the discharge end of the unit. Also, it may be preferred to partially enclose the lower portion of the cylindrical unit with hopper side walls 80 (Figs. 1-2) and a bottom plate 82 terminating in a debris discharge spout 84. A water spray pipe 86 (Figs. 1-2) may be mounted interiorly of the cylindrical unit and coupled to a suitable supply of wash water under pressure, for cleansing the produce as it is being decapped and destemmed.

Figure 5:
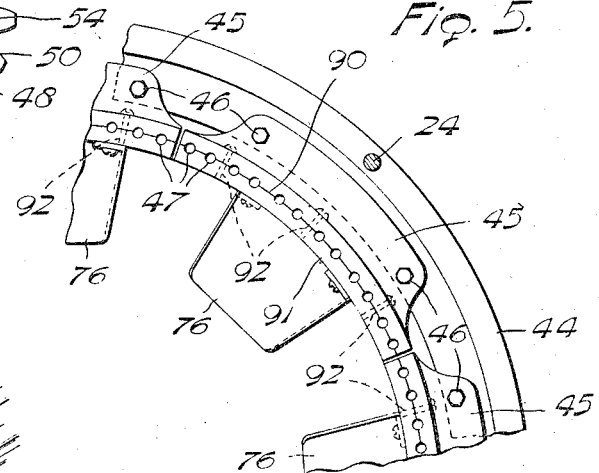
Fig. 5 is a fragmentary section, on an enlarged scale, as along line V—V of Fig. 3.
Figure 6:
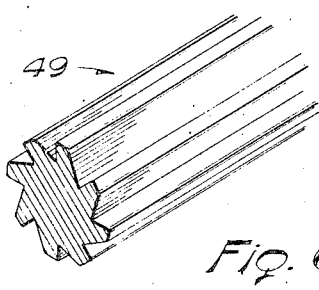
Fig. 6 is a sectional-perspective view of one of the fruit stem engaging devices of the machine.

As illustrated in Figs. 2-3, and in more detail in Fig. 5, the roll mounting segmental plates 42—45 are preferably split through the centers of the bearing spaces 47, as along line 90 (Fig. 5) and the inner or bearing cap portions 91 thereof are bolted to the bearing block portions thereof as by means of screws 92. Thus, initial assembly and servicing of the rolls 49—50 is facilitated because for roll mounting-dismounting operations it is only necessary to withdraw the screws 92 whereupon the bearing cap portions 91 will be free; and segments of the roller units may be thereby conveniently replaced as may be required from time to time without requiring disassembly of other parts of the machine.

Thus, it will be appreciated that the machine of the invention involves numerous important advantages and features from the structural as well as functional standpoints, and that the machine is adapted to handle berries or the like in improved manner and to discharge produce of improved quality. For example, it is a feature of the machine of the invention that as each roll unit (comprising a hard-surfaced and a soft-surfaced roll) revolves downwardly and under the load of produce which is travelling slowly through the machine, the roller unit will be operating so as to grip therebetween the fruit stems and caps which become presented to the nip space between the rolls due to the cycloidal tumbling action of the individual berries or pieces of fruit. Thus, when handling berries or fruit of normal ripeness the rollers will pluck the stems and caps therefrom with ease, as illustrated at the lower portion of Fig. 4 without subjecting the body of the fruit to bruising or the like. However, for example, whenever a "green" berry or the like is encountered it may be that the stem or cap thereof will not pull freely from the body, and in such case the rolls continue to draw upon the stem while the berry moves along with the roll unit upwardly and over across the top level of the machine as the cylindrical unit rotates. This causes the berry to twist and turn upon its stem, thereby adding gravity forces tending to disengage the cap-stem from the body. In event this further gravity action does not succeed in destemming the berry the roll unit will then carry the berry downwardly and force it to travel under the load of produce which is tumbling along in the lower portion of the cylindrical unit, thereby subjecting the berry to further dislodging forces; and these processes are repeated due to continued rotation of the cylindrical unit until the berry is destemmed.

Although only one form of the invention has been shown and described in detail, it will be apparent to those skilled in the art that the invention is not so limited but that various changes may be made therein without departing from the spirit of the invention or the scope of the appended claim.

What is claimed is:

A machine for destemming and decapping berries and fruit and the like, which comprises a cylindrical unit having its cylinder axis disposed substantially horizontally and mounted for rotation about said axis, means for rotating said cylindrical unit, said cylindrical unit including a ring-like element at each end thereof, a plurality of segmental bearing block devices carried by said rings to extend inwardly thereof, a plurality of bearing cap devices bolted to said bearing blocks and cooperating therewith to form journal means, a plurality of roller units comprising shafts journalled at their opposite ends in said journal means and extending between said ring-like elements to form the wall of said cylinder unit, each of said roller units comprising a pair of frictionally engaged rolls spaced away from the next adjacent roller unit, and means engaging said rolls and operable to cause the latter to rotate automatically in response to rotation of said cylindrical unit.

FREDERICK J. PAUL.

REFERENCES CITED

The following references are of record in the file of this patent:

UNITED STATES PATENTS

| Number | Name | Date |
|---|---|---|
| 580,742 | Vrooman | Apr. 13, 1897 |
| 1,029,918 | Dunkley | June 18, 1912 |
| 1,370,620 | Willson | Mar. 8, 1921 |
| 1,400,352 | Forry | Dec. 13, 1921 |
| 2,180,567 | Urschel | Nov. 21, 1939 |
| 2,323,668 | Morgan | July 6, 1943 |

FOREIGN PATENTS

| Number | Country | Date |
|---|---|---|
| 35,921 | France | Dec. 19, 1929 |
| (2nd addition to 631,894) | | |